United States Patent
Berlin (10) Patent No.: US 6,287,065 B1
(45) Date of Patent: Sep. 11, 2001

(54) SIMPLIFIED, HIGH-STRENGTH FASTENING DEVICE FOR USE IN BLIND HOLE, INACCESSIBLE APPLICATIONS

(76) Inventor: William Oliver Berlin, 915 Woodland Dr., Oakland City, IN (US) 47660

(*) Notice: Subject to any disclaimer, the term of this patent is extended or adjusted under 35 U.S.C. 154(b) by 0 days.

(21) Appl. No.: 09/575,269

(22) Filed: May 22, 2000

Related U.S. Application Data (60) Provisional application No. 60/135,178, filed on May 24, 1999.

(51) Int. Cl.$^7$ .................................................. F16B 21/00
(52) U.S. Cl. ........................... 411/340; 411/344; 411/346
(58) Field of Search .................................... 411/340, 341, 411/342, 343, 344, 345, 346

(56) References Cited

U.S. PATENT DOCUMENTS

| | | | |
|---|---|---|---|
| 526,088 | * | 9/1894 | Savill ................................ 411/342 X |
| 1,352,919 | * | 9/1920 | Salmons et al. ...................... 411/340 |
| 2,609,723 | * | 9/1952 | Stubbs .................................. 411/340 |
| 5,108,240 | * | 4/1992 | Liebig .................................. 411/344 |

FOREIGN PATENT DOCUMENTS

2446405 * 8/1980 (FR) ..................................... 411/340

* cited by examiner

*Primary Examiner*—Neill Wilson (57) ABSTRACT

A simplified, high-strength fastening device for securing fixtures, other objects, structural components, or members for use in "blind hole," inaccessible applications, particularly overhead or ceiling installations or wall portions having at least one concealed side. The fastening device can be installed easily, can be removed easily and used repeatedly, and can present a maximum bearing surface for engagement with the securing member for distributing an attached load evenly and uniformly upon said member.

The fastening device has two parts: (1) a specially shaped nut comprising the actual fastener, and (2) a plate attached hingedly to the nut that provides the means for inserting the nut through a blind hole and for urging it into operational position. The nut has a threaded bore located approximately at its center to receive a fastening commercially produced bolt of appropriate size and kind. The nut is sized slightly smaller in height and width than the blind hole through which it is to be passed, but is of substantially greater length than the greatest dimensions or diameter of said blind hole. The plate, of approximately the same width as the nut, but only nominally greater than half the length of the nut, is attached hingedly to one end of the nut, thus allowing it to pivot transversely to lie flat against the nut in operational position. The plate also has a threaded bore, of the same size and kind as that of the nut, located distally from the hinged connection point. These holes are in substantial vertical alignment in operational position, wherein the plate is interposed between the bottom contact surface of the nut and the inaccessible surface of the blind hole. To use the fastening device, the bolt is threaded into the threaded bore in the plate obverse to the nut and advanced through the plate only until it emerges from the bore. The bolt and plate, now combined, are pivoted arcuately away from the nut until the device is extended longitudinally approximately end-to-end. The nut is then urged through the blind hole until the bolt makes contact with the edge of the blind hole. The bolt is then urged in an arc of approximately 90 degrees, thus forcing the plate into contact with the inaccessible surface of the blind hole, which also causes the nut to become unbalanced and fall by gravity onto the plate, wherein the axes of the two threaded bores, in both plate and nut are nominally aligned. The bolt may then be advanced threadedly to engage the nut and may be further tightened until a satisfactory, secure fastening is obtained.

5 Claims, 7 Drawing Sheets

SIMPLIFIED, HIGH-STRENGTH FASTENING DEVICE FOR USE IN BLIND HOLE, INACCESSIBLE APPLICATIONS

This Application claims benefit of Provisional No. 60/135,178 filed May 24, 1999.

CROSS REFERENCE TO RELATED APPLICATIONS

Not Applicable.

STATEMENT REGARDING FEDERALLY SPONSORED RESEARCH AND DEVELOPMENT

No federally sponsored research or development was involved in this invention.

REFERENCE TO A MICROFICHE APPENDIX

Not Applicable.

BACKGROUND OF THE INVENTION

This invention relates to the art of fastening devices and, more particularly, to a fastening device for securing, supporting, depending, or otherwise attaching a component or fixture to a securing member and having access from only one surface thereof, in such instances as a relatively frangible ceiling, wall, hollow core door, shell construction, or as often found in stronger, double-walled compartments, bulkheads, and framing channels. The latter limiting characteristic is commonly known as a "blind hole" application; this term is used herein in such context. A long-standing problem has been to devise means whereby an adequate, secure fastening could be achieved in applications where making apertures large enough to permit manual access was impractical or prohibited, where fasteners have been installed after the initial construction or fabrication wherein inaccessible spaces were created, or wherever such surface attachment techniques were impractical or inappropriate, such as welding or brazing in flammable environments. The challenge to produce such fasteners has been complicated by the inclusions of such considerations as cost, both of materials and of production; efficacy; strength and dependability; and ease and speed of application.

A common problem encountered by housing construction workers, homeowners, and repairmen is that of securing fixtures and related hardware to surfaces and partitions that have a hollow portion between spaced support or framing members, such as ceilings, interior walls, fascia areas, and like structural forms. Aircraft, auto, ship, boat, construction industry, and retrofitting applications produce a multiplicity of circumstances wherein a strong fastener is needed for use in a "blind hole" application. Typically, nails or screws will not hold securely in gypsum, thin plywood, plasterboard, fiberglass, or thin metal without using reinforcing materials of appropriate kind and thickness. Even for metal bulkheads, metal screws are not as secure as would be a fastener with a threaded nut on the obverse side of the member to which an attachment or application is made if the obverse side were accessible.

Prior art has approached these problems through applying the general conceptualization of the toggle bolt or anchor, the expandable anchor or sleeve, and the plate with hingedly connected legs or straps and a slip collar finalizing the connection. Each of the classes of devices is analyzed below, chiefly in terms of problems, disadvantages, and shortcomings when used, inasmuch as it is well recognized that they are widely used, although limited in their utility in many ways, as will be noted.

The typical toggle includes an elongated, threaded body element with a toggle, which can be threaded onto and advanced along the bolt shaft by its rotation. The toggle may vary in type: (a) wing type, (b) spring biased type, (c) gravity type, (d) plastic wing nut type, (e) molly type, and (f) elastomeric flip toggle type. Types (a), (b), (d), and (f) require considerable fabrication and complex assembly of a multiplicity of parts, causing them to be comparatively costly. All of the types necessarily entail the use of much longer bolts or screws passing through the ceiling or wall opening than those needed to achieve the same purpose where both sides of the same securing element are accessible, thereby increasing the comparative costs.

Articulated toggles, chiefly found in types (a), (b), and (d), are often disposed to be inherently weak at the point(s) of articulation, where they fail under the excessive force when overtightened or under the stress of heavy loads. Toggles with spring-biased arrangements, type (b), are subject to failure of the small springs, or of the long, thin springs of some configurations, which become twisted, skewed, or radically deformed near the completion of the tightening process.

Specially designed parts or constituent elements, especially for types (a), (b), (c)., and (f) would increase the costs of these fasteners. The expandable toggles in general use have also required specially designed threaded bolts. This has limited the choices of lengths and diameters, thus curtailing the amount of affective stress that can be applied to the connection thereto. Toggles, especially types (a), (b), and (d), also require a hole through which to pass that is approximately twice the diameter of the bolt, thereby presenting a significant reduction in the critical area upon which the toggle will be depressed. Older gravity types, (c), with affixed toggles require special treatment of the excess bolt remaining on the accessible side of the connection after the tightening, i.e., cut off, bent upward, capped, et cetera.

In vertical applications, e.g., in hollow walls, it is difficult to align the toggle with the vertical axis of the connected element to obtain thereby the maximum support that may be needed for heavy loads upon the device. Additionally, toggles with wings of thin, channel-shaped metal often cut into gypsum board and plaster, especially if overtightened, thereby substantially weakening the connection.

Those toggles of types (d), (e), and (f), whether comprised totally or in part of elastomeric materials, are necessarily limited in the stress to which they may be subjected in a given installation because of the inherent fragility of these materials. Additionally, some of these materials are of such recent development that their degradation parameters are still subject to verification.

With only a few exceptions, toggles are not reusable. In most instances, the bolt elements may be salvaged, but the toggles are deformed beyond repair, or they cannot be retracted or recaptured and are discarded inside the hollow space.

Anchor bolts and expansion sleeves, or sheaths, often are ineffective when used overhead, when used in very thin partitions, or when coupled against a direct stress exerted in the same direction as their longitudinal axes. The majority of these types also are not reusable. Additionally, they are difficult to remove in the event it is desired to repair the area of penetration and restore it to its original plane of finish.

The anchor assemblies comprised of an anchor plate with a pair of elongated leg members and slip collars for affixing them to the accessible surface of the application are limited in the maximum strength available in the leg members. Any fixture or attached hardware to be used with the fasteners must accommodate the size and the protrusion of the slip collar on the accessible surface. Additionally, the need to space the legs across the anchor plate limits the minimum size of the anchor, thereby requiring larger holes for applicability.

Finally, there is, perhaps, the overriding concern to be addressed relative to the several weak parts involved in currently available fasteners, especially those with several parts in one device, and the relatively fragile kinds of connections, attachments, or suspension points presented therewith for use in blind hole applications. To phrase it from a different perspective, there is still a need for a very strong unitary fastener for these purposes.

SUMMARY OF THE INVENTION

The summary is comprised of two sections. In the first section, the objects of the invention are listed. The second section is given to the description of the invention.

1. The objects of this invention are:
   (a) to provide a simplified and improved procedure for installing a fastening device through a blind hole in an overhead or vertical securing member;
   (b) to provide, for this same purpose, using the procedure noted in (a), a very high-strength fastening device comprised of components with configuration and size that:
      (1) can be installed easily and quickly,
      (2) can be removed easily and completely from an installed location,
      (3) can be used repeatedly, and
      (4) can present a maximum bearing surface for engagement with the securing member and, because of its configuration, will distribute an attached load evenly upon said member;
   (c) to provide a fastening device, for this same purpose, that is simpler in its construction, therefore comparatively cheaper to produce, and, having but two components, is therefore less likely to fail than more complex, elaborate fasteners either in installation or in use thereafter;
   (d) to provide a fastening device that will equal or exceed the tensile strength, the capability, or the required performance standards, e.g., those of the ANSI, of any comparable types of devices to suspend a load, to withstand a pull, to resist a force exerted upon it when positioned in an overhead blind hole location, or to sustain a stress in the direction of the axis of its threaded bore in a horizontal application;
   (e) to provide a type of fastening device that can be adapted extensively to fabrication from practically any materials or combinations of materials from which any other regular, standard bolt-with-nut type of fastening device may be fabricated, including space-age materials and newly developed kinds, thus providing a fastening device that is as strong and as dependable as the materials from which it is created and providing a dependable fastening device for use in specialized or restricted situations wherein many kinds of toggles, anchors, et cetera, could not be applied;
   (f) to provide a fastening device that will permit the use of a standard industrial threaded bolt with said device that equals or exceeds the strength or capacity of the nut that would ordinarily be matched and used with the bolt or any of a variety of readily available, commercially prepared, longitudinally oriented, threaded fastening elements.
   (g) to provide a fastening device that can be passed into the inaccessible hollow space in a ceiling or a wall through an opening that may be sized just large enough to accommodate the width and height dimensions of the fastening device, and which, in comparison, needs to be no greater than the outside circumference of a common, standard threaded nut of such size and proportion as would have been used had the fastening operation been totally accessible; and
   (h) to provide a fastening device that can be configured to present such maximum bearing surface along its longitudinal axis as any installation might require.

2. The objects stated above, other features, and other advantages will become more readily apparent and more readily understood by those skilled in the art when considered in view of the description, the drawings, and the specification presented below. In this presentation, these considerations are obtained in this invention that is comprised of only two parts: (1) a primary component, comprising the actual fastener and (2) a secondary component that provides, in conjunction with a bolt, as described below, the means by which the primary component is inserted through the blind hole and is urged into operational position. Both components are constructed of strong steel in the preferred embodiment herewith described.

The primary component, in essence, is actually a specially shaped nut. It is essentially a rectangular parallelepiped that is necessarily sized of slightly smaller dimension in height and width, but of substantially greater length, than the diameter, or dimensions, of the blind hole through which it is to be passed. The term "nut" will be used to designate or indicate this primary component hereinafter. In different embodiments or comprised of different materials, the shape of the nut may vary appreciably as long as it displays these stated characteristic dimensional and relational parameters.

The secondary component is a rectangular, flat plate of approximately the same width as the nut, but only nominally greater than half the length of the nut. The term "plate" will be used to designate or indicate this secondary component hereinafter. It is attached to the nut proximate to a longitudinal terminus thereof in such a way that it pivots transversely to abut the surface of the nut that is contiguous, in its operational position, to the inaccessible surface of the securing member inside the blind hole. Thus, in operational position, the plate is interposed between the bottom contact surface of the nut and said inaccessible surface. To obviate the uneven dispersion of pressure from said bottom contact surface of said nut upon said inaccessible surface of the securing member when the fastening device is tightened, said bottom contact surface is configured with a stepped, or bi-level, portion of approximately the same thickness dimension as that of said plate, raised so that, when they are juxtaposed in operational position, their surfaces contacting that of the securing member are in the same general plane.

Both the nut and the plate are pierced by a threaded bore of predetermined size and kind so that the bores in each part are aligned along the same vertical axis when in operational position. Said threaded bore in the nut is located substantially near its center and is relatively perpendicular to the longitudinal and transverse axes of said nut and to those axes of the plate. This location in the nut causes said threaded bore, projected in alignment, to penetrate the plate proximate to its edge distal from the point of pivotal attachment to the nut when in operational position, as noted above. The length of the plate is thus further defined as including the diameter of the threaded bore therein plus the width of a thin rim of material sufficient to contain the helical threads of the bore in this distal terminal edge.

To make the fastening device operative, the aforementioned threaded bolt must be obtained. This bolt, or whatever elongated threaded fastener of selected characteristic is to be employed, needs to be only of sufficient length to engage the summed dimensions of the total length of said threaded bore through said nut, the total length of said threaded bore through said plate, the thickness dimension of the securing element(s) through which it is to pass, and the thickness dimensions of any fixture, hardware, washers, cap, et cetera, indicated for the installation.

The procedure for placing the fastening device in its operational position is necessarily preceded by screwing the bolt, having attached any selected articles as noted above, into the threaded bore of said plate, beginning from its surface side that will abut the interior contact surface of the blind hole, but advancing it through said plate only until said bolt end first inserted begins to protrude from the obverse surface. The plate, now in combination with the bolt, is then pivoted outwardly away from said nut until it lies approximately in the same plane as the nut, longitudinally extended end-to-end.

This articulated configuration permits the insertion of the fastening device longitudinally through said blind hole in the securing means until the bolt comes into contact with the outer edge of said blind hole on its accessible surface, thus interrupting the insertion procedure momentarily; the bolt thus will be positioned approximately parallel to said accessible surface. During this step in the procedure, the freely pivotable nut, attracted by gravity, begins to fall as soon as its length clears the restrictive material around said blind hole in the securing member through which said nut is being urged.

At this point in the procedure, with said edge of said blind hole serving as a pivot point, the shaft of said bolt is urged away from its position proximate to the accessible surface of the securing member in an arc of approximately 90 degrees until said bolt's longitudinal axis aligns approximately with the axis of said blind hole that is perpendicular to said accessible surface of the securing member. This movement forces said plate, already almost entirely within said blind hole, toward contact with the interior inaccessible surface of the securing member, and further, said movement permits the completion of the insertion procedure without further manipulation.

In an overhead or vertical installation, the nut, upon insertion, pivots downwardly due to gravitational attraction until it rests juxtaposed upon said plate with which it is articulated. In this juxtaposition, the threaded bores of both said nut and said plate are aligned, as revealed above, thus allowing said bolt, already threadedly engaged totally through said bore of said plate, to be rotationally engaged in and continually advanced along said aligned threaded bore of said nut until deemed securely fastened in appropriate operational position.

In walls, bulkheads, or other horizontal installations, the insertion and securing procedure is the same except that, when the said two components in the extended articulation configuration are inserted through said blind hole horizontally until the bolt contacts the accessible edge of said hole, note should be taken, for purposes of optimizing ease of application, to orient the fastening device so that said bolt extends upwardly with respect to the top of the blind hole in said bolt's position approximately parallel to the accessible surface of the securing member. Thus, with appropriate attention, when the bolt is urged to pivot into approximate alignment with the horizontal axis of said blind hole, said attached plate therefore will pivot upwardly on the blind side of the securing member, providing therewith the proper receiving position for said nut, in response to gravity, to pivot downwardly into the desired juxtaposition upon said plate. Said bolt may then be rotated, engaging said nut, and advanced through said threaded bores until satisfactory, secure fastening is obtained.

BRIEF DESCRIPTION OF THE DRAWINGS

The features of the invention will become more readily apparent when considered in view of the drawings and specifications, in which:

FIG. 1 through FIG. 4 present drawings of the invention in standard two-dimensional multiview projections.

DESCRIPTION OF PREFERRED EMBODIMENT

Referring now more particularly to the drawings, wherein like reference symbols indicate the same parts or features throughout the several views presented, the present invention, together with the various alternative embodiments thereof, will be described in detail. There is shown a high-strength fastening device of iron generally at 10, embodying the present invention, for fastening to a securing member 50 of predetermined thickness through a blind hole 30 of predetermined dimension in said securing member 50

As shown in FIGS. 1 to 16, the fastening device 10 is comprised of a special nut 12 with a plate 20. In an application of the fastening device 10, a common commercially available bolt or elongated threaded fastener 55 is threadedly engaged, as shown in FIGS. 8 to 14 and in FIG. 16.

The special elongated nut 12 fabricated of iron or steel is of predetermined thickness, or height 13, and of predetermined width 14, neither dimension being greater than the distance across said blind hole 30 at its narrowest point, and of predetermined length 15 greater than the distance across said blind hole 30 at its widest point. Further, said nut 12 is pierced by an internally threaded bore 16 of predetermined size located substantially near the center of said nut 12 and relatively perpendicular to the transverse axes of said nut 12 in order to receive a fastening bolt or other elongated threaded fastener 55; and said nut 12 further configured with a stepped, bi-level surface 40 comprising the surface that abuts the inaccessible side, i.e., the blind side 30A, of the securing member 50, said stepped portion 40 being predeterminedly greater in cross section and encompassing substantially all of that surface 40 of the nut 12 from the given end to the nearest point tangential to the circumference of the threaded bore 16, said bore 16, as it breaks the ventral plane of the nut 12 being totally incorporated in the remaining stepped down portion 12A of said nut 12; and further, with said stepped down portion 12A having a slotted aperture 17 of predetermined dimensions, predetermined orientation, and predetermined location proximate the terminus 19 of said stepped down portion 12A farthest from said threaded bore 16, as ascertainable in FIGS. 1, 2, 4, 5, and 6.

Figures 8, 9:
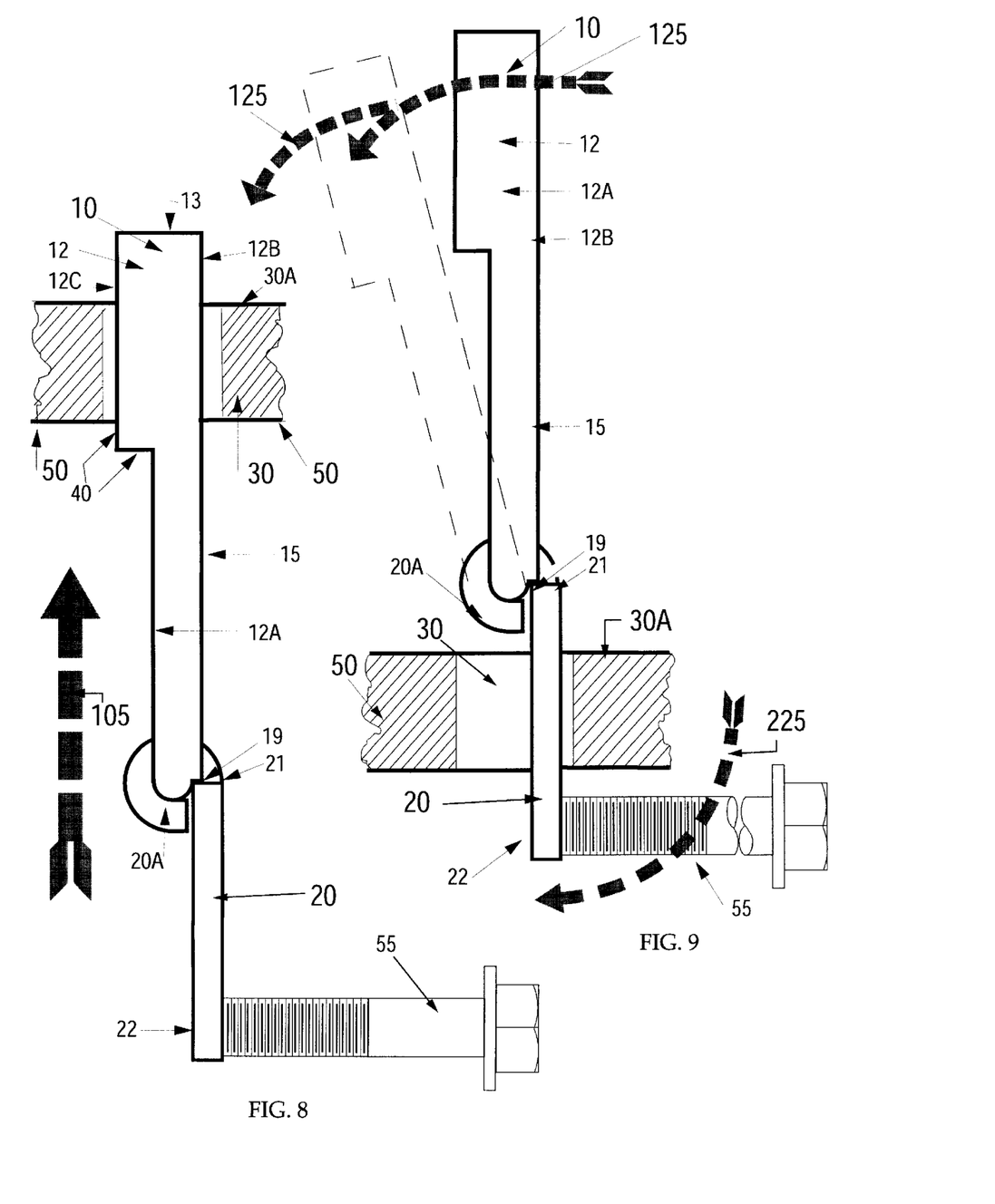
FIG. 8 shows the invention, with the above described plate extended and with a commercial bolt threadedly engaged thereto, in the initial stage of insertion vertically through a prepared aperture of predetermined dimensions in the securing member, where it is to be urged upward, as indicated and as described below.
FIG. 9 shows the device vertically inserted through said aperture to the point of contact of the bolt with the accessible surface of the securing member, where it is indicated that the bolt is then to be urged downwardly in an arc. The drawing further indicates that the aforementioned nut is beginning to pivot downwardly toward its horizontal operational position in reaction to the force of gravity.
Figure 10:
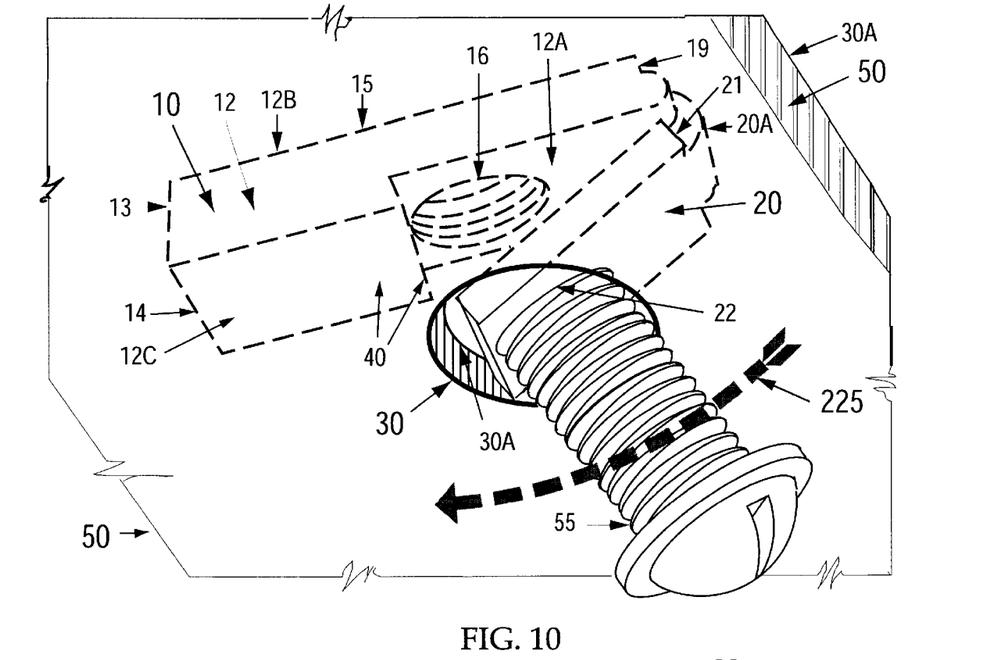
FIG. 10, a perspective drawing of the first embodiment of the invention, shows a continuance of the movement of the bolt, noted in the previous paragraph, and depicts it in readiness to clear the confines of the blind hole on its inaccessible side and to position the aforementioned plate downwardly toward the upper, inaccessible surface of the blind hole by urging the affixed bolt through an arc from horizontal to vertical position.
Figure 11:
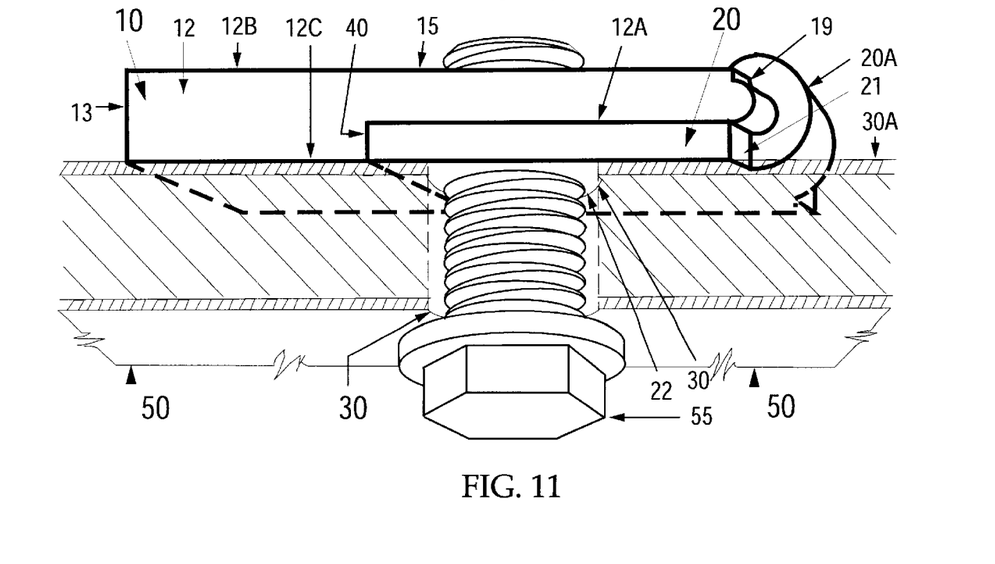
FIG. 11 shows a perspective view of a first embodiment of the device in operational position superimposed on a cross section of the securing member.
Figure 13:
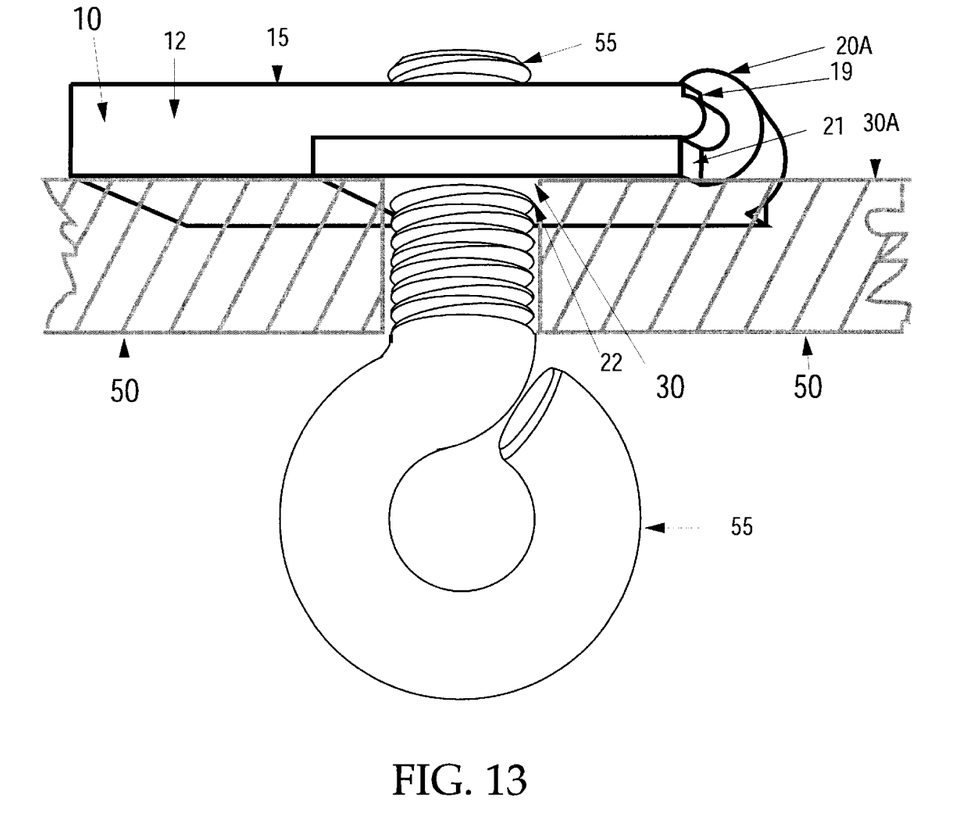
FIG. 13 shows a perspective drawing of an alternate embodiment of the device in operational position superimposed on a cross section of the securing member. This embodiment would be suitable for very high stress applications.
Figure 14:
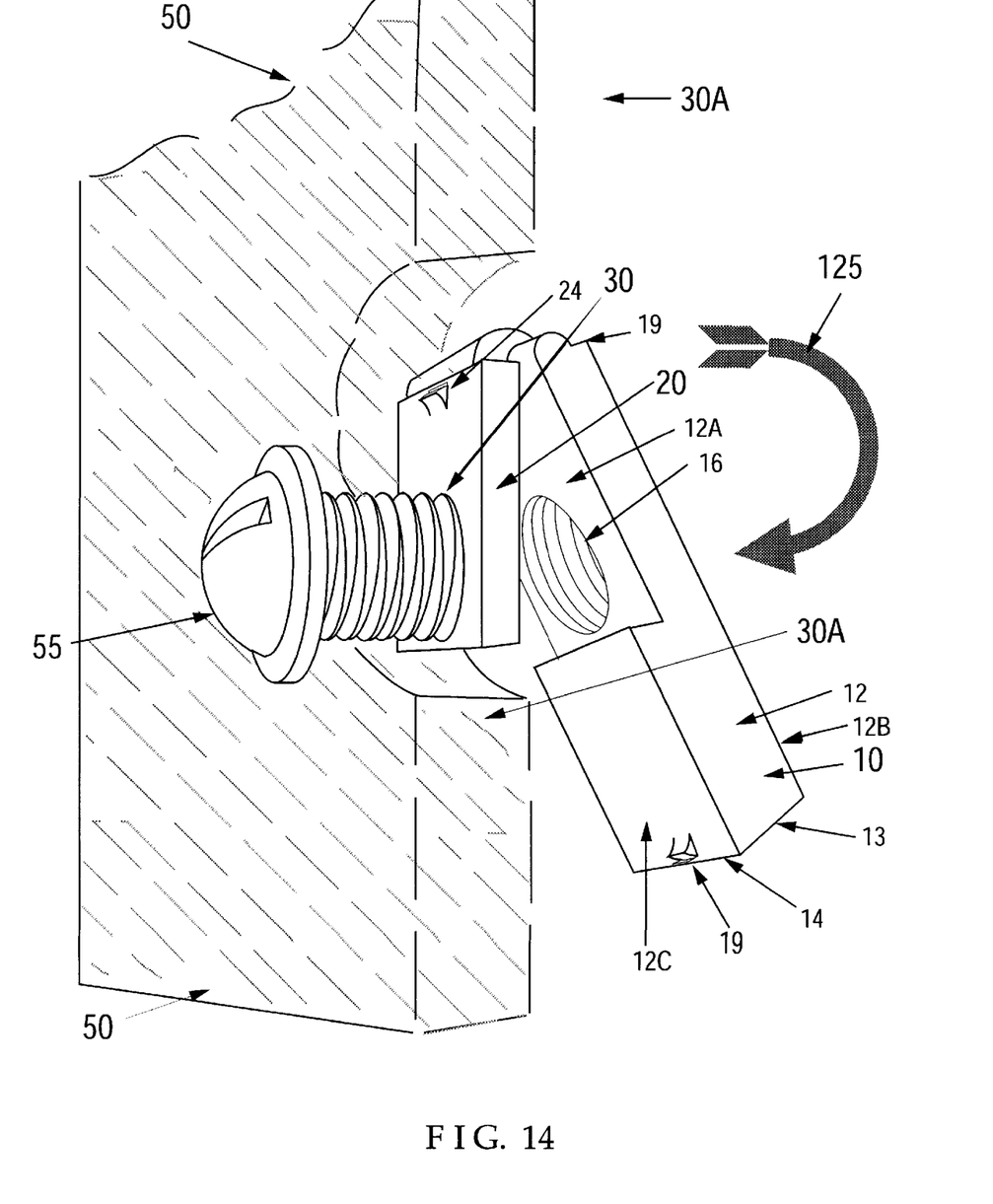
FIG. 14 shows a perspective drawing of the preferred embodiment, in a partial cut-away view, approaching operational position following insertion through a vertical partition or panel. This drawing shows a variation wherein the nut and the plate both have deformed protruding spurs near the opposite extremes of their surfaces designated for contact with the securing member to aid in preventing the device from rotating during the tightening process.
Figure 16:
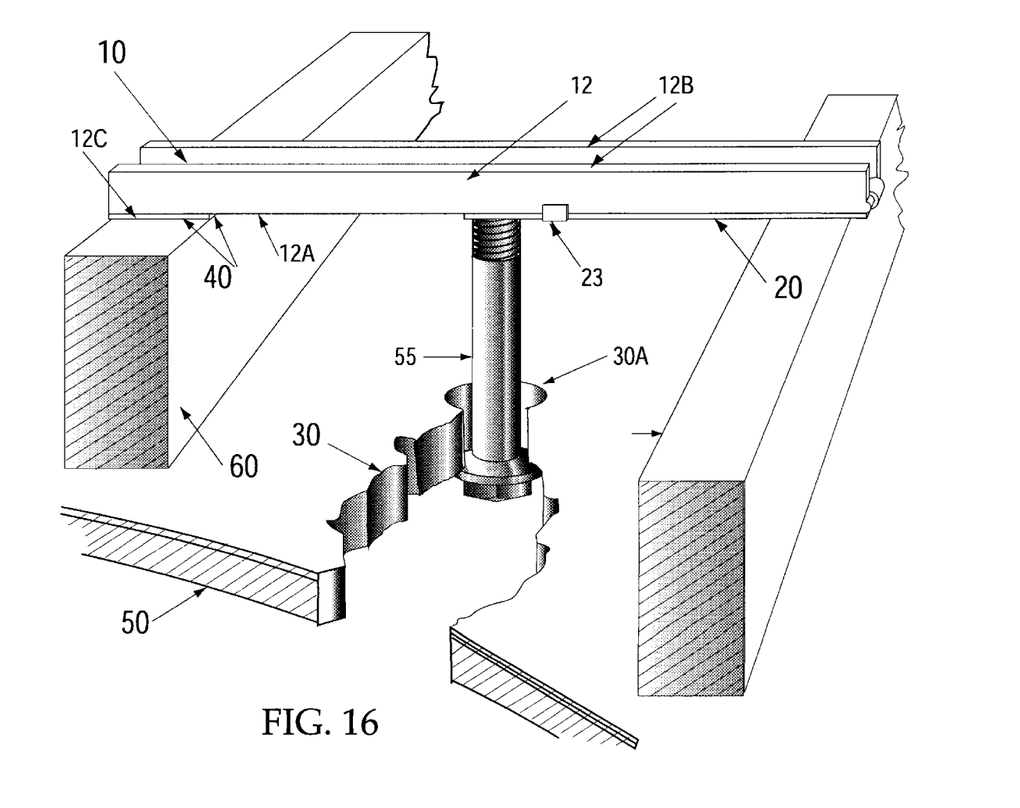
FIG. 16 shows a perspective drawing of the long alternative embodiment of the device in operational position. This drawing illustrates the object that there need be no determinate length for the device in application, nor is it necessary for the device to be juxtaposed directly against the inaccessible side of a blind hole to be effective.

The plate 20, also fabricated of similar grade sheet iron or steel material, is comprised of a substantially rectangular flat plate generally matching the dimensions of said stepped down surface's area 12A and complementary to said surface 12A when in operational position; said plate 20 further having a projection 20A of predetermined size and shape that is deformed through said slotted aperture 17 in the nut 12, thereby encircling that segment 18 of said nut 12 lying beyond said aperture 17 toward the terminus 19 of said nut 12, therewith appending said plate 20 to said nut 12 and permitting said plate 20 to pivot in hinge-like manner 25 about said encircled segment 18 relatively in the same plane as the superior 12B and inferior 12C surfaces of said nut 12; said plate's 20 pivotal action 25 being limited by its shoulder 21 striking, at 19, the body of the nut 12 in one direction and by its juncture with said complementary face 12A of said nut 12 in the other direction. The plate 20 also is penetrated by a threaded bore 22, of the same dimensions and helical configuration as said threaded bore 16 transfixing said nut 12, and this threaded bore 22 is situated proximate the terminus of said plate 20 opposite the pivotal projection 20A, the precise location of said plate's threaded bore 22 being predetermined so that when said plate 20 is in contact and conformity with the stepped down surface 12A of said nut 12 in the operational position of the fastening device 10, as shown in FIGS. 11, 13, and 16, the threaded bores of both the plate 20 and the nut 12th are in vertical alignment about a common projected axis, thus allowing said bolt 55 to threadedly engage first the plate 20 and then the nut 12, respectively, when rotated manually or mechanically in accordance with direction of the helical configuration. As noted above and as shown in FIGS. 8, 9, 10, and 14, the bolt 55 is first rotatably engaged with the plate 20 only until the threaded bore 22 is fully penetrated. In this relational attachment, the bolt 55 becomes a means whereby the extended nut 12 may be supported and guided as it is urged through 105 the blind hole 30 and as a lever 225 to position said nut 12 against the inaccessible surface 30A in an application, as may be seen in FIGS. 8, 9, 10, and 14. During this latter action 225, the distal edge, or rim, of the blind hole 30 on the inaccessible surface 30A is used as a fulcrum point against which the plate 20 is pressed when said bolt 55 is urged 225 in an arc from a position generally parallel to the accessible surface of the securing member 50 toward a position that is generally perpendicular to the longitudinal axis of said blind hole 30. The levering action will rapidly change the state of inertia and the point of balance of the nut 12 wherein the force of gravity will predominate and the nut 12 will pivot downwardly 125, as shown in FIGS. 9 and 14 and as may be inferred in FIG. 10.

When the plate 20 is in substantially full contact with the inaccessible surface 30A of the securing member 50, the nut 12, constrained by the cylindrically shaped projection 20A of said plate 20 deformed around the nut segment 18, will have pivoted 125 downwardly into juxtaposition upon said plate 12 where, with reasonable care, said bolt 55 may be rotated until said nut 12 is engaged thereupon, thus achieving operational position, as depicted in FIGS. 11, 13, and 16, and as relationally configured illustrated by FIGS. 1 through 4. The final tightening may then be completed, as required. The tightening procedure may be aided by spurs 24 deformed outwardly from ventral surfaces during the manufacturing process of the alternative embodiments, as depicted in FIG. 14, wherein these small, sharp triangular shaped projections 24 would help prevent the fastening device 10 from rotating as the bolt 55 was advanced into the threaded bores 22, 16.

Figure 12:
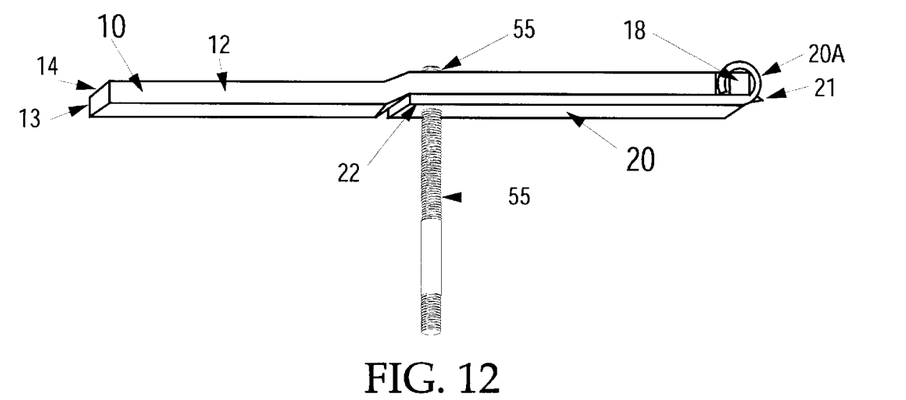
FIG. 12 shows a perspective drawing of an alternate embodiment of the device in operational position with a stud bolt attached. The embodiment represents some variations in fabrication techniques and is of thinner, more economical materials for low to medium stress applications and further demonstrates the versatility of the device for a variety of applications.

An alternative embodiment is shown in FIG. 12 for light to medium stress applications that would be more economical to manufacture because it is fabricated of thinner material, which factor would also allow a less expensive stamping process to be used in forming the device 10, especially with regard to forming the ferrule 20A and the pivot stop 21, to assembling the plate 20 to the nut 12 around segment 18, and in creating the stepped down portion of the nut 12.

Figure 1:
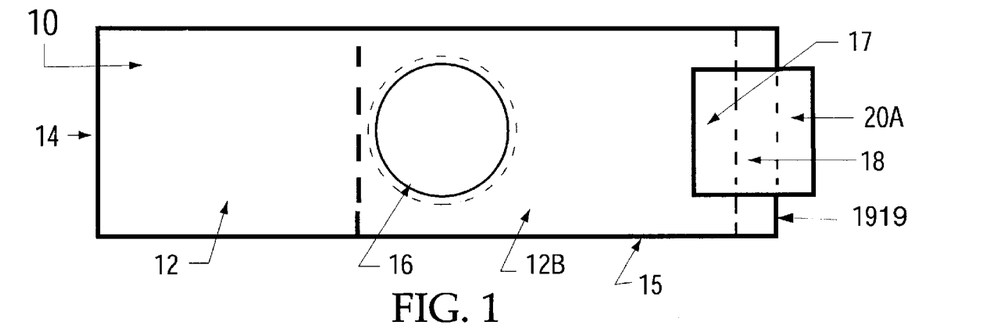
FIG. 1 shows the top view, horizontal projection, or plan view, of the device in operational position.
Figure 2:
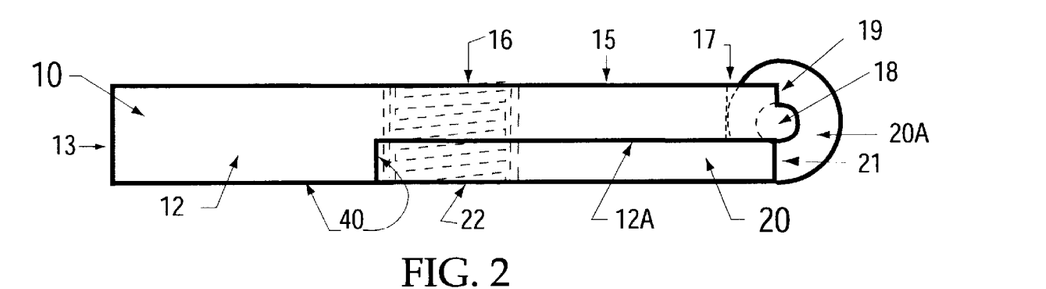
FIG. 2 shows the front elevation, vertical projection, of the device in operational position.
Figure 3:
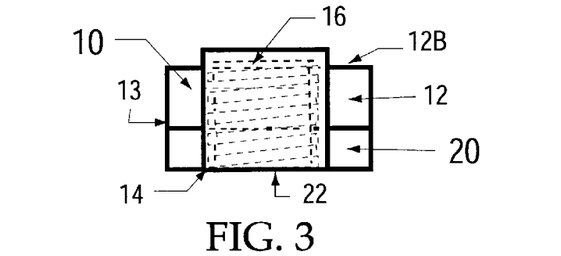
FIG. 3 shows the profile projection, right side elevation, of the device in operational position.
Figure 4:
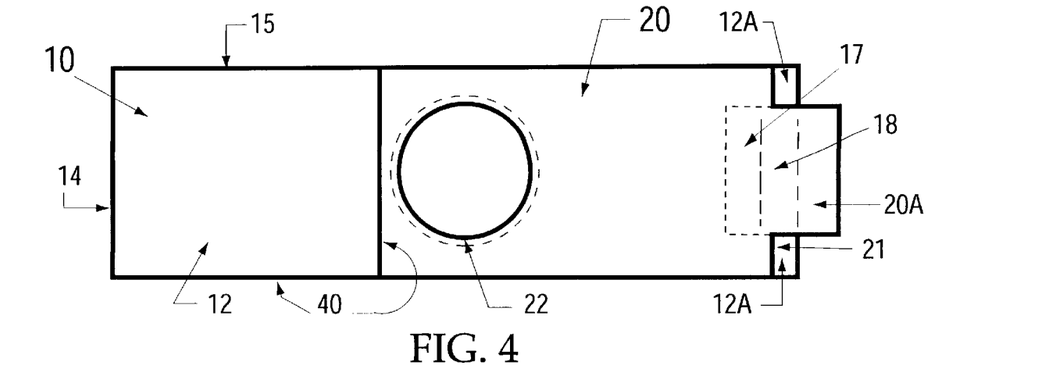
FIG. 4 shows the bottom view, horizontal projection, of the device in operational position, as an aid for further comprehension.
Figure 5:
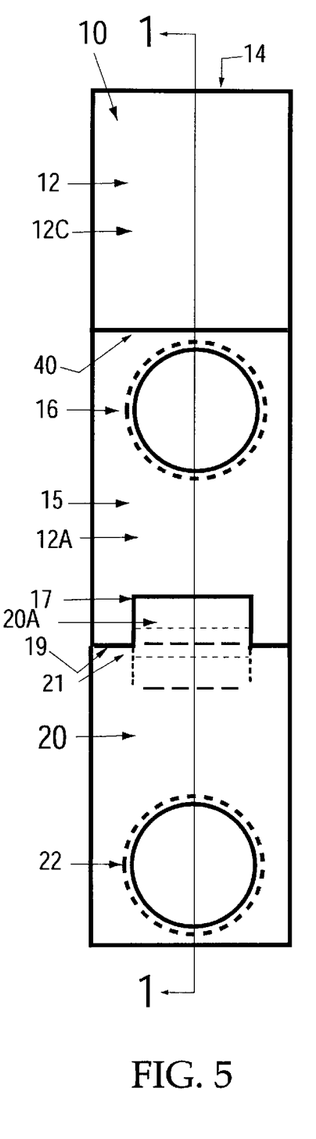
FIG. 5, included for added clarity, shows a bottom view, horizontal projection, of the device with the aforementioned plate pivoted outwardly to its fully extended position.
Figure 6:
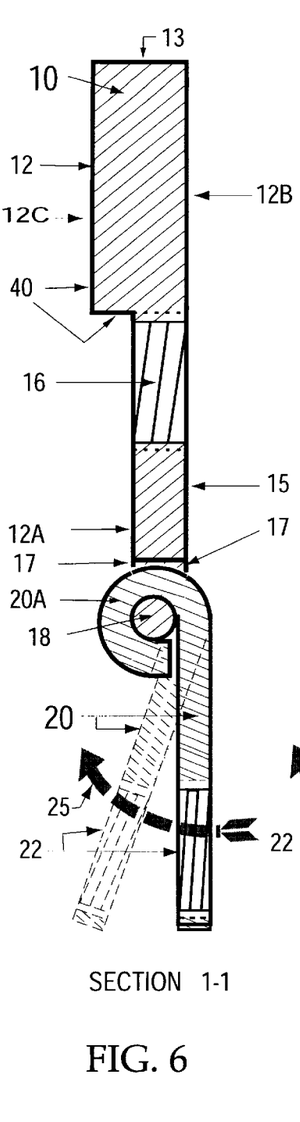
FIG. 6, also added for similar purpose, duplicates the front elevation shown in FIG. 2, above, but is shown in cross section with the plate member fully extended, the configuration of the device that permits its insertion through an aperture of appropriate size.
Figure 7:
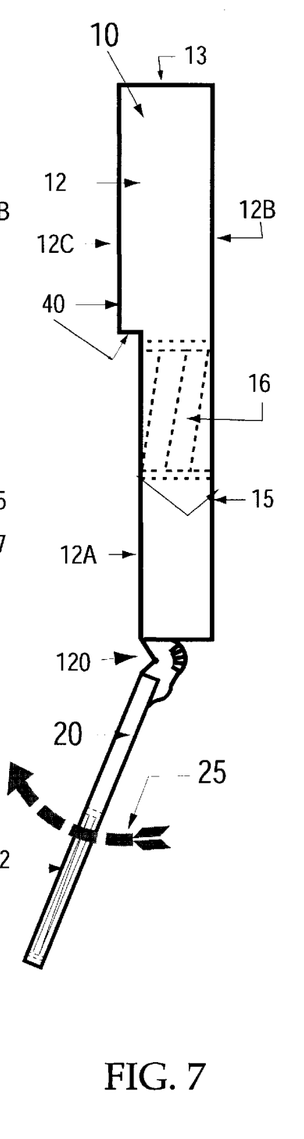
FIG. 7 shows a different embodiment of the invention in extended position for insertion through an aperture, or blind hole. This drawing represents an embodiment of the device fabricated from an elastomeric plastic material, as described below.

The alternative embodiment for light stress applications depicted in FIG. 7 could be manufactured easily and economically from elastomeric plastic or similar material wherein the plate 20 and the nut 12 are fabricated as one piece, with the portion serving as the pivot 120 having plastic memory, causing the plate 20 and the nut 12 to return to approximate operational position after being spread apart.

The alternative embodiments shown in FIGS. 11 and 13 represent the very high strength, high stress fastening devices 10 that could be fabricated of the strongest materials and of a wide variety thereof. These devices 10 also represent the concept embodied in the invention that there is no limitation to size beyond practicality and economy.

Figure 15:
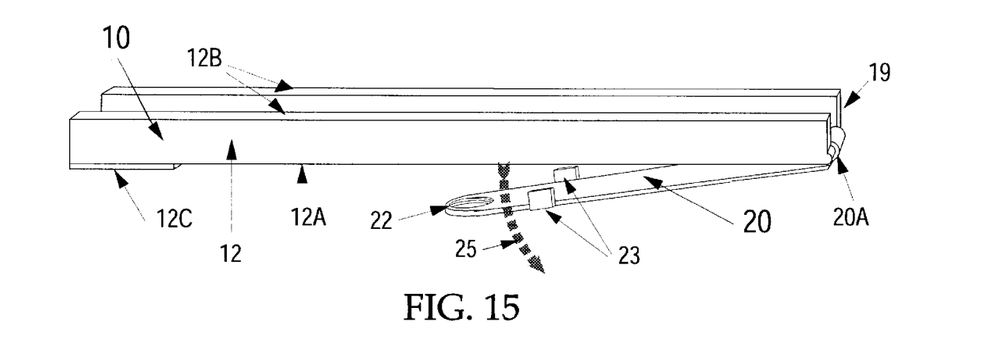
FIG. 15 shows a perspective drawing of an alternate embodiment of the device that depicts the main element, fabricated from channel-shaped iron or steel, with the stepped bi-level surface that serves to provide level repose in operational position being achieved by spot welding, or otherwise affixing a rectangle of appropriate material to the channel. Additionally, the drawing shows the plate, noted above, deformed to include two guide brackets, further described below, that provide lateral stability to this lengthier embodiment during the tightening process.

The final embodiment, shown in FIGS. 15 and 16, further supports the concept relating to the size of the fastening device 10. This embodiment shows the nut 12 fabricated from channel shaped steel which is comparatively light in weight but strong, thus more easily enabling its manipulation during an application. As depicted, the nut 12 is of sufficient length 15 to span across the tops of two adjacent ceiling joists 60 set on the customary 16" centers. To serve the purpose of leveling the device 10, a separate steel rectangle 12C of approximately the same lateral dimensions as the width of the nut 12 and the width of the structural member 60 and of approximately the same height as the plate 20 is affixed by spot welding or other mechanical means to the ventral surface 12A of said nut at the terminus thereof opposite the attached plate 20, thus creating the stepped down portion 40 of said nut 12 at 12C. In this embodiment, two guide brackets 23 are added to the lateral edges of the plate 20 proximate to the threaded bore 22. Said guide brackets 23 are deformed approximately perpendicular to the lateral plane of said plate 20 in such way that said guide brackets 23 are substantially contiguous with the sides of said nut 12 when the fastening device 10 is in operational position, as may be ascertained in FIG. 16, said guide brackets 23 therein serving to enhance the alignment of said plate 20 and nut 12 as the tightening procedure is initiated, especially by reducing the risk of transverse slippage that potentially may occur because of the greater length of the two components of the fastening device 10.

What is claimed is:

1. A fastener assembly for inserting an elongated fastener member within an opening defined by an overhead horizontal or vertical structural portion or arrangement having at least one concealed side, commonly called a blind hole, and comprising:

A. a primary component consisting of a specially or specifically shaped nut,
   (1) said nut having the width and thickness dimensions slightly smaller than the dimensions of said blind hole through which said nut is to be passed, but having length sufficiently greater than said blind hole's dimension;
   (2) said nut further having a threaded bore piercing the approximate center of said nut's largest contact areas and perpendicular to the longitudinal and transverse axes thereof capable of threadedly engaging a commercially produced bolt of appropriate size and kind;
   (3) with a generally rectangular slot through the material from which said nut is fabricated and of predetermined size located proximate to the longitudinal terminal edge distal from said threaded bore; and
   (4) having the bottom surface of said nut, which will be proximate to the inaccessible surface of the securing member in said fastener's operational position, configured with a stepped, or bi-level, portion, the thicker of which portion will contact said inaccessible surface of the securing member; and B. a secondary component consisting of a substantially rectangular, flat plate of approximately the same width as said nut, but only nominally greater than half the length of said nut, and of approximately the same thickness dimension as the difference in height between said configurationally stepped bottom surfaces of said nut, said plate being:
   (1) attached hingedly to said nut through said slot, as described in subparagraph A(3), above, in such a way that said plate can be pivoted slightly more than 180° transversely about its pivot point, being constrained from further pivotal movement by the body of said nut, so that
     a. in the procedure for inserting said nut into said opening, said plate can be fully extended outward laterally from said nut at its pivotal point of attachment to said nut, and
     b. said plate, following said insertion procedure, can be pivoted then in the opposite direction to abut the contiguous surface of said nut, wherein said plate and said nut are juxtaposed, thus presenting an approximate single level plane for contact that obviates an uneven distribution of pressure from said bottom contact surface of said nut with said inaccessible surface of the securing member when the fastening device is tightened;
   (2) also pierced by a threaded bore of the same predetermined size and kind as that of said nut, as explicated in subparagraph A(2), above, that penetrates said plate proximate to its edge distal from the point of pivotal attachment to said nut and that is relatively perpendicular to the longitudinal and transverse axes of said plate; and
   (3) said plate being further defined as including the diameter of its threaded bore therein plus the width of a thin rim of material from which formed sufficient to contain the helical threads of the bore piercing this distal terminal edge.

2. A fastener assembly according to claim 1, wherein, in its operational position in an installation, said plate is interposed between the said bottom contact surface of said nut and said inaccessible surface of said blind hole.

3. A fastener assembly as defined in claim 1 that can receive a commercially produced bolt of appropriate size and kind, which, when threadedly engaged in said threaded bore of said plate, serves (a) initially as a handle and as a means to dispose, urge, guide, and direct said fastener assembly through said blind hole into an operational position within said hole, then (b) as means for achieving satisfactory tightness and operational readiness of said fastener assembly by advancing said bolt threadedly to the extent desired into said bores of both said plate and said nut when juxtaposed and with said threaded bores in alignment vertically in final operational position.

4. A fastener assembly according to claim 2, characterized in that:
   A. such deployment, leverage, and mobile capability as may be generated is the result of attaching said bolt at a right angle to said plate by threadedly engaging said bolt in said threaded bore that pierces said plate, starting from the aforememtioned bottom contact surface and threadably advancing said bolt through said plate only to the extent that the anterior end of the threaded portion of said bolt may be perceived to break the obverse plane of said plate, and
   B. subsequent readiness for the insertion or placement of said fastener assembly is obtained by extending said plate with said bolt attached outward laterally in the plane of said nut.

5. A procedure for assembling, inserting, and positioning said fastener assembly, as characterized in claim 1 or claim 2, into operational position within said blind hole, wherein:
   A. the first step, or action, to be taken in achieving an operational position for said fastener assembly is to:
      (1) threadedly engage a commercially produced bolt of appropriate size and kind, and bearing such hardware, washers, et cetera, as required, in the threaded bore of said plate starting from the aforesaid contact side and to advance said bolt rotationally just until the anterior end of said threaded portion of said bolt may be perceived to break the obverse plane of said plate;
      (2) pivot said hinged plate transversely, using said engaged bolt, to its farthest extreme away from said nut, so that said plate and said nut lie open in approximately the same plane;
      (3) position the free end of said nut at the accessible edge of said blind hole; and
   B. the second step, or action, to be taken in achieving an operational position for said fastener assembly is to:
      (1) urge said nut with said attached plate through said blind hole until said bolt encounters the lip, or accessible edge, of said blind hole, then,
      (2) using said lip of said blind hole as a fulcrum, urge said bolt arcuately approximately 90 degrees,
         a. which will align said bolt generally with the central axis of said blind hole and will bring the contact surface of said plate into approximate operational position against said inaccessible surface of said blind hole, and
         b. which will cause said nut to fall earthward through gravitational attraction (if said nut had not already fallen because of variations in force and movement while being urged through said blind hole, as described in subparagraph B(1), above) whereupon said nut will come to rest juxtaposed upon said plate with said threaded bores of bolt of said plate and said nut into approximate center alignment, so that
         c. said bolt can be advanced to engage said nut; so that
   C. the final step, or action, to be taken in achieving an operational position for said fastener assembly is to:
      (1) advance said bolt threadedly from its position in said plate, already described in subparagraph 2 A(1), above, to engage said nut ascertainably,
      (2) make minor position adjustments relative to situational needs and conditions, then
      (3) further advance said bolt until the desired tightness is achieved.

* * * * *